United States Patent
Imafuku et al.

(10) Patent No.: US 7,433,121 B2
(45) Date of Patent: Oct. 7, 2008

(54) PROJECTION TYPE IMAGE DISPLAY APPARATUS

(75) Inventors: Daisuke Imafuku, Fujisawa (JP); Koji Hirata, Yokohama (JP); Naoyuki Ogura, Machinda (JP)

(73) Assignee: Hitachi, Ltd., Tokyo (JP)

( * ) Notice: Subject to any disclaimer, the term of this patent is extended or adjusted under 35 U.S.C. 154(b) by 246 days.

(21) Appl. No.: 11/513,524

(22) Filed: Aug. 30, 2006

(65) Prior Publication Data

US 2007/0229948 A1    Oct. 4, 2007

(30) Foreign Application Priority Data

Mar. 31, 2006   (JP)   .............................. 2006-096408

(51) Int. Cl.
G03B 21/56   (2006.01)

(52) U.S. Cl. ...................................... 359/443

(58) Field of Classification Search ................. 359/443, 359/460
See application file for complete search history.

(56) References Cited

FOREIGN PATENT DOCUMENTS

JP    2001-154274    6/2001

Primary Examiner—Christopher E Mahoney
(74) Attorney, Agent, or Firm—Townsend and Townsend and Crew LLP

(57) ABSTRACT

A screen is hung from a screen frame with hanging members bonded to the upper side of a front sheet. Supporting members are disposed on the lower side of the front sheet and, by mounting a Fresnel lens sheet on the supporting members, a tension is given by its weight to the front sheet in the vertical direction. Further, a tension in the horizontal direction is given to the front sheet. Long holes are so formed in the hanging members that the hanging members on the right and left sides of the screen by expansion or contraction of the screen are made greater in the extent of shifting in the horizontal direction than the hanging member in the central part.

12 Claims, 4 Drawing Sheets

PROJECTION TYPE IMAGE DISPLAY APPARATUS

INCORPORATION BY REFERENCE

The present application claims priority from Japanese application JP 2006-096408 filed on Mar. 31, 2006, the content of which is hereby incorporated by reference into this application.

BACKGROUND OF THE INVENTION

1. Field of the Invention

The present invention relates to a rear projection type image display apparatus for forming an enlarged image on a screen by projecting an image from behind the screen, and more particularly to a technique for appropriately fitting the screen to the apparatus.

2. Description of the Related Art

With respect to a screen to be fitted to a rear projection type image display apparatus (hereinafter sometimes referred to as simply "apparatus"), it is known to prevent the screen from warping, bending or deformation otherwise by giving tensions in the up-and-down (vertical) and right-and-left (horizontal) directions. For instance, JP-A-2001-154274 (on paragraphs 0022 through 0025, and in FIGS. 6 through 7) discloses a way of providing a tension in the vertical direction of a lenticular lens sheet with the weights of a glass sheet and a Fresnel lens sheet and a tension in its horizontal direction with a coil spring or the like.

BRIEF SUMMARY OF THE INVENTION

A screen for a rear projection type image display apparatus is usually formed of a resin, such as acryl. For this reason, the screen may be expanded or contracted by variations in the ambient temperature and/or humidity of the apparatus, and thereby warped, bent or otherwise deformed (hereinafter these deformations will be collectively referred to as "distortions"). In recent years, to reduce the cost and weight of the apparatus, the thickness of the screen, especially of its lenticular sheet, has come to be thinned, which makes the screen even more susceptible to variations in the ambient temperature and/or humidity.

According to JP-A-2001-154274, as shown in FIG. 6 of its specification, a block-shaped member is disposed on the upper part of the screen, and the screen is given tension in the vertical direction when it is hung by mounting this member on the angled part of a metal fitting provided at the top of the housing of the apparatus. In this configuration, however, because of the large area of contact between the block-shaped member and the angled part, it is difficult to slide the block-shaped member so as to absorb distortions due to variations in the ambient temperature and/or humidity. Thus, it is difficult for the conventional configuration to absorb the distortions of the screen due to variations in the ambient temperature and/or humidity.

An object of the present invention, attempted in view of the circumstances descried above, is to provide a technique by which distortions of the screen due to variations in the ambient temperature and/or humidity can be reduced satisfactorily.

In order to achieve the object stated above, the invention is characterized of a configuration in which hanging members to be fitted to the screen frame are disposed at the center of the upper side and on the right and left sides of the screen, and the extents of shifting of the hanging members disposed on the right and left sides of the screen in the horizontal direction are made greater than the extent of shifting of the hanging member disposed at the center of the screen in the horizontal direction. More specifically, a hole into which a boss of the screen frame is to be inserted is bored in each of the plurality of hanging members, and the holes in the hanging members positioned on the right and left sides of the screen are made greater in size in the horizontal direction than the hole in the hanging member disposed at the center of the screen.

It is preferable for the screen to comprise a front sheet for diffusing lights of the image at least in the horizontal direction and a Fresnel lens sheet which is arranged on the light incidence side of the front sheet, and for the plurality of hanging members to be disposed on the upper side of the front sheet. It is also preferable for the front sheet to be given a tension in the vertical direction by the weight of the Fresnel lens sheet and a tension in the horizontal direction by members giving tension.

As the configuration described above enables the right and left sides of the screen with reference to its center to move in the horizontal direction according to the expansion or contraction of the screen, any distortion of the screen due to the expansion or contraction can be eased or absorbed satisfactorily.

Other objects, features and advantages of the invention will become apparent from the following description of the embodiments of the invention taken in conjunction with the accompanying drawings.

DETAILED DESCRIPTION OF THE INVENTION

A preferred embodiment of the present invention will be described in detail below with reference to the accompanying drawings. In these drawings, elements having common functions will be denoted by respectively the same reference signs, and their description will not be repeated with a view to avoiding redundancy.

Figure 1:
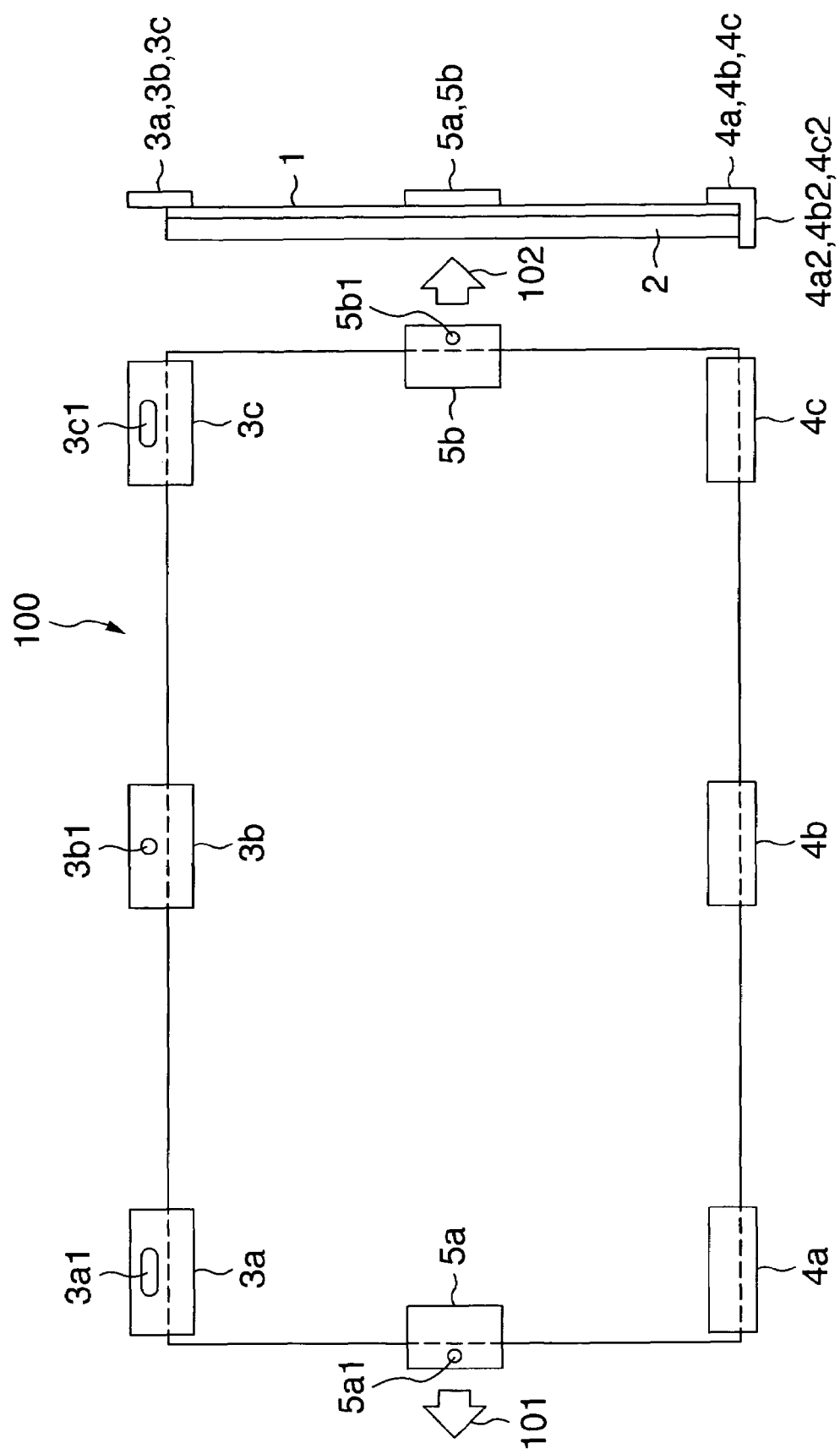
FIG. 1 is a configurational diagram of a screen according to a preferred embodiment of the invention.

A screen 100 according to the preferred embodiment of the invention, has a Fresnel lens sheet 2 and a front sheet 1 as shown in FIG. 1. The Fresnel lens sheet 2 converts oblique lights coming incident from an image generating source (not shown) into substantially parallel lights. A lenticular lens is formed on, for instance, the incidence side of the front sheet 1, which diffuses the parallel lights from the Fresnel lens sheet 2 at least in the horizontal direction of the image frame to improve the directionality as viewed by the watcher. At the top of the front sheet 1, a plurality of plate-shaped hanging members 3 are disposed along the long side. At the bottom of the front sheet 1, a plurality of supporting members 4, each having an L section, are arranged along the long side. At the right and left ends of the front sheet 1, coupling members 5 to be coupled to tensioning members including coil springs, wires and the like (not shown) are provided.

The front sheet 1, as an optical member for diffusing lights in the horizontal (right-and-left) and vertical (up-and-down) directions of the screen, may be a lenticular lens sheet containing a diffusing material.

It may as well be a full-reflection type diffusing sheet on which many full-reflection faces extending in the vertical direction are arranged in the horizontal direction, or a bead-type diffusing sheet on which minute beads are densely arranged. It may also be a sheet provided with a diffusing function by some other element. Although a diffusing sheet of any type can be applied to this embodiment, in the following description will refer to a case in which a lenticular lens sheet is used as the front sheet 1 for the sake of convenience.

In this embodiment, an acrylic resin is used as the base material of the lenticular lens sheet 1 as the front sheet and the Fresnel lens sheet 2. In this embodiment, the thickness of the lenticular lens sheet 1 is set to about 0.45 mm and that of the Fresnel lens sheet 2 to about 2 mm to reduce the weight and cost of the screen. As it is as thin as 0.45 mm, the lenticular lens sheet 1 is susceptible to distortions by variations in temperature and/or humidity. For this reason, the lenticular lens sheet 1 is given tensions in the up-and-down and right-and-left directions of the image frame as will be described afterwards.

The lenticular lens sheet 1 has a plurality of (in this case three) hanging members 3a, 3b and 3c stuck to its long side in the upper part with an adhesive, and as many supporting members 4a, 4b and 4c, each having an L section, stuck to its long side in the lower part with an adhesive. At substantially the respective centers of the right and left sides, the coupling members 5a and 5b are similarly stuck with an adhesive. As shown in FIG. 1, the hanging member 3b is disposed in the central part of the upper side of the lenticular lens 1, the hanging member 3a in the left part of the upper side of the lenticular lens 1, and the hanging member 3c in the right part of the upper side of the lenticular lens 1. The supporting members 4a, 4b and 4c provided on the bottom side of the lenticular lens 1 are matched in position respectively with the hanging members 3a, 3b and 3c in the vertical direction of the screen.

The members used in this embodiment measure as follows: the hanging members 3a and 3c, 20 mm in width×80 mm in length×1.2 mm in thickness; the hanging member 3b, 20 mm (w)×120 mm (l)×1.2 mm (t); the supporting members 4a, 4b and 4c, 15 mm (w)×60 mm (l)×1.2 mm (t) on the screen face side and 5 mm (w)×60 mm (l)×1.2 mm (t) on the L-shaped bent side; and the coupling members 5a and 5b, 20 mm (w)×120 mm (l)×1.2 mm (t).

As described above, the hanging members 3 and the supporting members 4 are arranged as follows: the hanging member 3b and the supporting member 4b substantially at the respective centers of the long sides of the lenticular lens sheet 1, and the hanging members 3a and 3c and the supporting members 4a and 4c, substantially symmetrically with respect to the hanging member 3b and the supporting member 4b, respectively, in the middle. The reason for this symmetric arrangement will be explained afterwards.

Incidentally, the hanging members 3 and the supporting members 4 are arranged with substantially equal spacing for the following reason. As the hanging members 3 (3a, 3b and 3c) and the supporting members 4 (4a, 4b and 4c) differ in thickness from the lenticular lens sheet 1, they are also different from the sheet in expansion or contraction characteristic in response to humidity and/or temperature variations. For instance, the lateral expansion of the lenticular lens sheet 1 due to the absorption of moisture is restrained by the smaller expansion of the hanging members 3 and the supporting members 4, which are thicker than the lenticular lens sheet 1 and begin to expand later than the lenticular lens sheet 1. To absorb this difference in expansion or contraction, the members are set to the aforementioned respective sizes to reduce the areas of adhesion between them and thereby prevent their planarity from being deteriorated.

A round hole 3b1 is bored in the hanging member 3b at substantially the center in its lengthwise direction (the direction along the long side of the lenticular lens sheet 1). Long holes 3a1 and 3c1, long in the lengthwise direction, are formed at substantially the respective centers of the hanging members 3a and 3c. Thus, the long holes 3a1 and 3c1 are elliptic shaped, whose horizontal dimension is longer than that of the round hole 3b1. The reason for this difference in length will be explained afterwards. Round holes 5a1 and 5b1 are bored in the coupling members 5a and 5b at substantially the respective centers of their lengthwise direction (the direction along the short side of the lenticular lens sheet 1).

Figure 2:
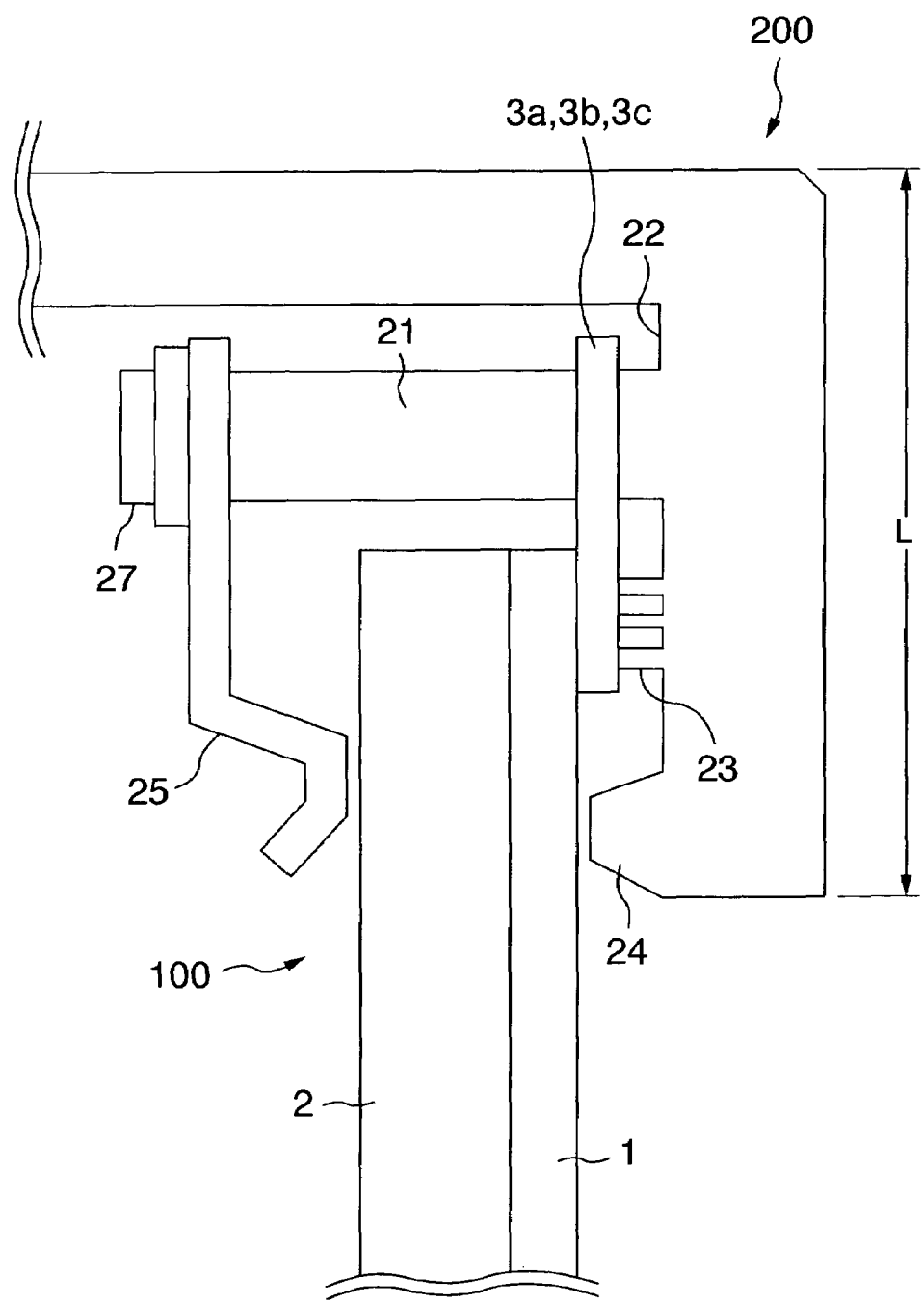
FIG. 2 shows an enlarged view of a section of the screen according to this embodiment in the vicinity of its top side.
Figure 3:
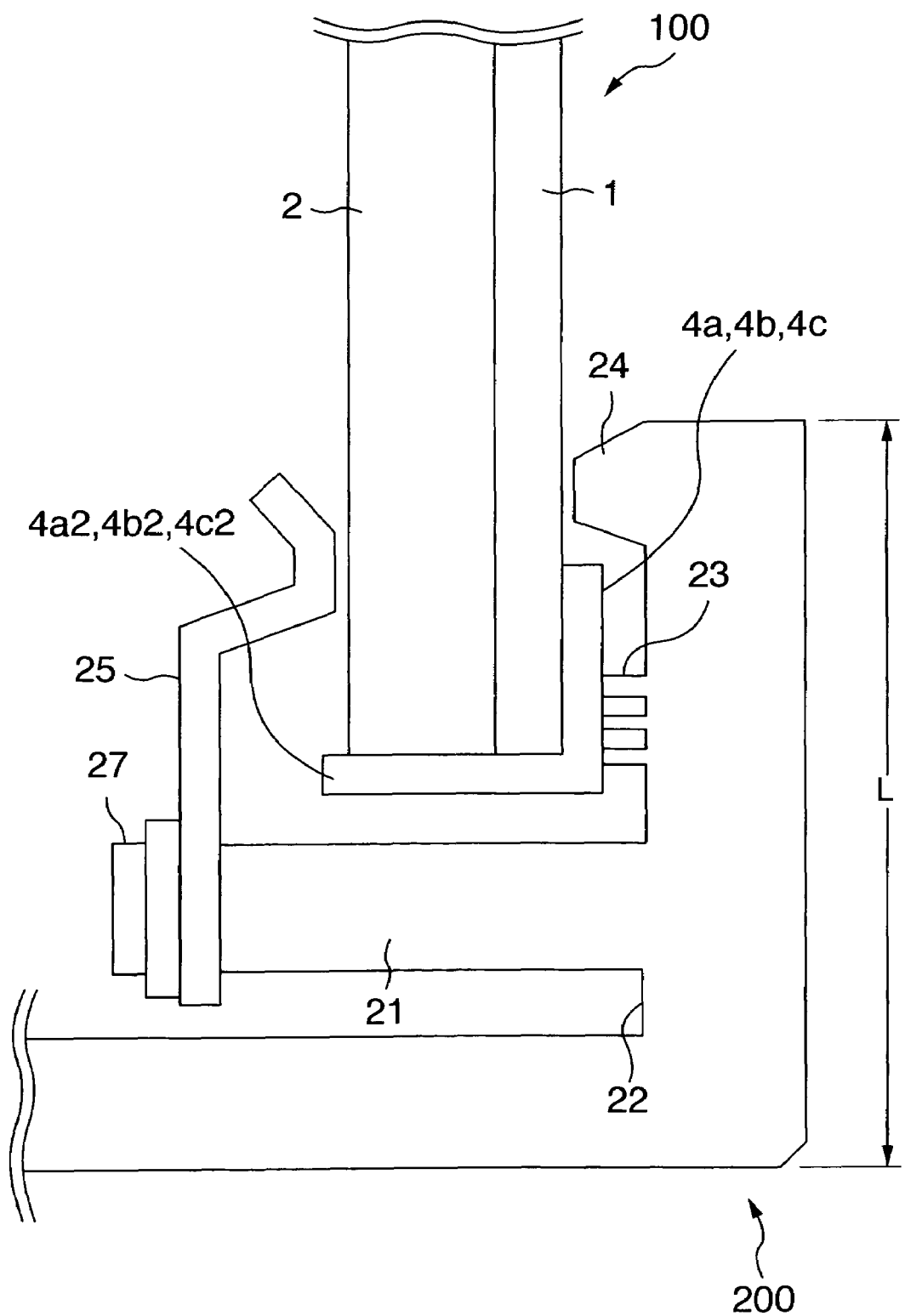
FIG. 3 shows an enlarged view of a section of the screen according to this embodiment in the vicinity of its bottom side.

The lenticular lens sheet 1 to which the hanging members 3, the supporting members 4 and the coupling members 5 are stuck and the Fresnel lens sheet 2 are fitted to the screen frame of the rear projection type image display apparatus via the hanging members 3 and the supporting members 4. FIG. 2 and FIG. 3 show how they are fitted.

A screen frame 200 for fitting the screen 100 is fixed to the housing of the apparatus, and polystyrene resin (PS) is used as its base material. As is evident from FIG. 2 and FIG. 3, a columnar boss 21 each for fixing the screen hold fitting extending backward from the inner face 22 on the front face facing the watcher (in the direction parallel to the perpendicular of the main plane of the screen) is formed matching a hole in each hanging member 3 or supporting member 4 in the upper and lower parts of the screen frame 200. Comb-shaped projections 23 for holding the screen 100 are formed on the inner face 22 on the front face toward the watcher in contact with the hanging members 3 or the supporting members 4. Further, convexes 24 are formed on the peripheries of the inner face 22 to make the screen holding structure including the projections 23 invisible from outside. These convexes 24 visually conceal the projections 23 and related members.

The absence of direct contact between the convexes 24 and the screen 100 is intended to prevent, when the screen oscillates, the screen from being damaged by friction with the convexes 24 and the damage, if it does occur, from becoming visible to the watcher.

By arranging the projections 23 which hold the screen 100 in contact with it in positions matching the hanging members 3, it is made possible to reduce the vertical dimension L of the screen frame 200 on its front facing the watcher. This enables the material cost to be correspondingly saved.

When fitting the screen, first the respectively matching bosses 21 for fixing the screen hold fittings are inserted into the holes 3a1, 3b1 and 3c1 of the hanging members 3 (3a, 3b and 3c) of the lenticular lens sheet 1 to fit the lenticular lens sheet 1 to the screen frame 200. Next, the Fresnel lens sheet 2 is mounted on the angled parts 4a2, 4b2 and 4c2 of the supporting members 4 (4a, 4b and 4c) on the lower side of the lenticular lens sheet 1. Then, screen hold fittings 25 are inserted into the bosses 21 for fixing the screen hold fittings and fixed with screws 27.

In this way, the screen 100 is hung from the bosses 21 for fixing the screen hold fittings and held, pinched between the projections 23 and the screen hold fittings 25. This causes the lenticular lens sheet 1 to be given tension by the weight of the Fresnel lens sheet 2 via the angled parts 4a2, 4b2 and 4c2 of the supporting members 4 (4a, 4b and 4c).

In this mechanism, prescribed gaps are secured to prevent the screen hold fittings 25 from coming into contact with the Fresnel lens sheet 2. The prescribed gaps are intended to allow thermal expansion of the thickness and enable the load of the Fresnel lens sheet 2 to securely work on the angled parts 4a2, 4b2 and 4c2 of the supporting members 4 (4a, 4b and 4c).

In this embodiment, as described above, the load of the Fresnel lens sheet 2 gives a tension to the lenticular lens sheet 1 in the vertical direction of the screen. This serves to reduce distortions in the vertical direction of the screen accompanied by expansion or contraction causing from variations in the temperature and/or humidity around the apparatus.

Distortions in the horizontal direction of the screen are reduced by having tensioning members (not shown) composed of elastic members, such as coil springs or leaf springs, or wires give a tension in the horizontal direction. One end of each of these tensioning members is coupled with one or the other of the coupling members 5a and 5b, and the other end is fitted to the housing of the apparatus. By pulling the coupling members 5a and 5b with the tensioning members in the directions of arrows 101 and 102 in FIG. 1, a tension is given to the screen in the horizontal direction. One end of each of the tensioning members (e.g. one end of a coil spring) is hooked on one or the other of the round holes 5a1 and 5b1 of the coupling members 5a and 5b.

Incidentally, though the coupling members 5 (5a and 5b) are disposed at substantially the respective centers of the right and left sides of the lenticular lens sheet 1 here, their positions are not limited to these. For instance, a plurality of coupling members may as well be provided at substantially the respective centers and upper and lower positions, three positions in total, of the right and left sides, or in even more positions. Where a plurality of coupling members are to be disposed, it is preferable for the number of the coupling members 5 to be odd so that they can be symmetric vertically with reference to the center of the screen in the vertical direction, but their number may as well be even. As the right and left sides of the screen are shorter than the upper and lower sides, it is preferable for the number of the coupling members 5 to smaller than that of the hanging members 3 or the supporting members 4, but they may as well be equal in number.

Next, the substantially symmetric arrangement of the hanging members and the supporting members and the hole shape of the hanging members will be described. As stated above, the round hole 3b1 for inserting the boss 21 for fixing the screen hold fittings is bored in the hanging member 3b in this embodiment. As the hole bored in the hanging member 3b is the round hole 3b1, it has a positioning role in addition to the role of hanging the lenticular lens sheet 1. The long holes 3a1 and 3c1 respectively bored in the hanging members 3a and 3c have greater sizes in their horizontal direction than the size of the round hole 3b1 in the horizontal direction.

For this reason, besides having the role of hanging the lenticular lens sheet 1, the long holes 3a1 and 3c1 can cause the hanging members 3a and 3c to slide in the horizontal direction when the lenticular lens sheet 1 has been expanded or contracted by variations in the ambient temperature and/or humidity. Thus, as the elliptic-shape long holes 3a1 and 3c1 are bored in the hanging members 3a and 3c, they can move more than the hanging member 3b in the horizontal direction. Therefore, when the screen (especially the lenticular lens sheet 1) has been expanded or contracted by variations in the ambient temperature and/or humidity, the hanging members 3a and 3c are slid by that expansion or contraction along the long holes 3a1 and 3c1 separately from the hanging member 3b.

Thus, when the screen has expanded or contracted, the left and right sides of the screen with reference to its center (the round hole 3b1) are made slidable in the horizontal direction along the long holes 3a1 and 3c1. As a result, any distortion of the screen due to its contraction or expansion can be eased or absorbed.

In this embodiment, the long holes 3a1 and 3c1 of the hanging members 3a and 3c and the respectively matching columnar bosses 21 are in contact with each other in a state close to line contact because the hanging members are only 1.2 mm thick. For this reason, the frictional resistances between the bosses 21 and the long holes 3a1 and 3c1 are small, allowing their easy sliding. This feature serves to reduce any distortion of the screen in the lateral direction of the screen frame by expansion or contraction in response to humidity and/or temperature variations.

Moreover, as the base material of the screen frame 200 is a resin in this embodiment, its expansion or contraction characteristic in response to humidity and/or temperature variations can be made substantially the same as that of the resin-made screen. This feature also contributes to reducing the distortion of the screen in the horizontal direction of the screen frame.

Furthermore, in this embodiment, as the hanging members 3a and 3c are arranged in substantial symmetry between right and left with respect to the hanging member 3b, the sliding in the lateral direction of the screen frame takes place symmetrically with reference to the center of the round hole 3b1 of the hanging member 3b. Thus, the rightward and leftward expanding or contracting forces are substantially equal. Therefore, the tensions of the tensioning members, such as coil springs, provided on the right and left sides of the screen frame can be substantially equalized. For this reason, the same appropriate coil springs can be used, which contributes to reducing the cost in respect of parts management and the quantity used.

Next, the tension in the vertical direction will be explained. The load applied to the lenticular lens sheet 1 is made adequate for reducing any distortion of the lenticular lens sheet 1 and for applying a moderate enough tension not to break the lenticular lens sheet 1. It is preferable for the tension then (the load per unit area of the lenticular lens sheet 1) to be between about 0.10 g/cm$^2$ and 0.50 g/cm$^2$.

For instance, where the screen size (i.e. the size of the lenticular lens sheet 1 and of the Fresnel lens sheet 2) is 50 inches, the area of the lenticular lens sheet 1 is about 7600 cm$^2$ and the weight of the Fresnel lens sheet 2 is about 2 kg. The weight of the supporting members 3 disposed in the lower part of the lenticular lens sheet 1 being assumed to be about 500 g, the load (tension) then working on the lenticular lens sheet 1 will be about 2.5 kg, and the tension per unit area (cm$^2$), about 0.33 g/cm$^2$. Or where the screen size is 70 inches, the area of the lenticular lens sheet 1 is about 15200 cm$^2$, and the weight of the Fresnel lens sheet 2 is about 4 kg. The weight of supporting members 3 being similarly assumed to be about 500 g, the load (tension) then working on the lenticular lens sheet 1 will be about 4.5 kg, and the tension per unit area (cm$^2$), about 0.30 g/cm$^2$.

Although the thickness of the lenticular lens sheet 1 is supposed to be 0.45 mm and that of the Fresnel lens sheet 2 to be 2.0 mm in this embodiment to give such a tension, these are not the only possible choices. Any thicknesses would be permissible if only the tension per unit area is between 0.10 g/cm$^2$ and 0.50 g/cm$^2$. However, since the lenticular lens sheet currently used in three-tube type rear projection type image display apparatuses is about 0.75 mm thick, the preferable thickness of the lenticular lens sheet 1 from the viewpoints of reducing the cost and weight of the screen is not more than 0.75 mm, more preferably about 0.5 mm. This thickness would enable the tension per unit area to be kept between 0.10 $g/cm^2$ and 0.50 $g/cm^2$, and any distortion of the screen can be reduced satisfactorily.

Next, the tension in the horizontal direction will be explained. Since the screen 100 is arranged in this embodiment with reference to the round hole 3$b$1 of the hanging member 3$b$, the tensions provided by the tensioning members disposed on the right and left sides of the screen can be substantially equalized and set to appropriate values.

The tension in the horizontal direction then would be as follows, for instance. It is supposed that the lenticular lens sheet 1 is 0.45 mm thick, the Fresnel lens sheet 2 is 2 mm thick and the size of each is 50 inches. It is further supposed that the lenticular lens sheet 1 is given a tension in the vertical direction by the load of the Fresnel lens sheet 2 and the ambient temperature is −10° C. to 50° C., and the humidity is 95% at the maximum temperature of 40° C. It was confirmed by experiment that, when a tension of about 24.5 N was applied in the horizontal direction under these conditions, the lenticular lens sheet 1 suffered no distortion even if the ambient temperature and the humidity varied.

Figure 4:
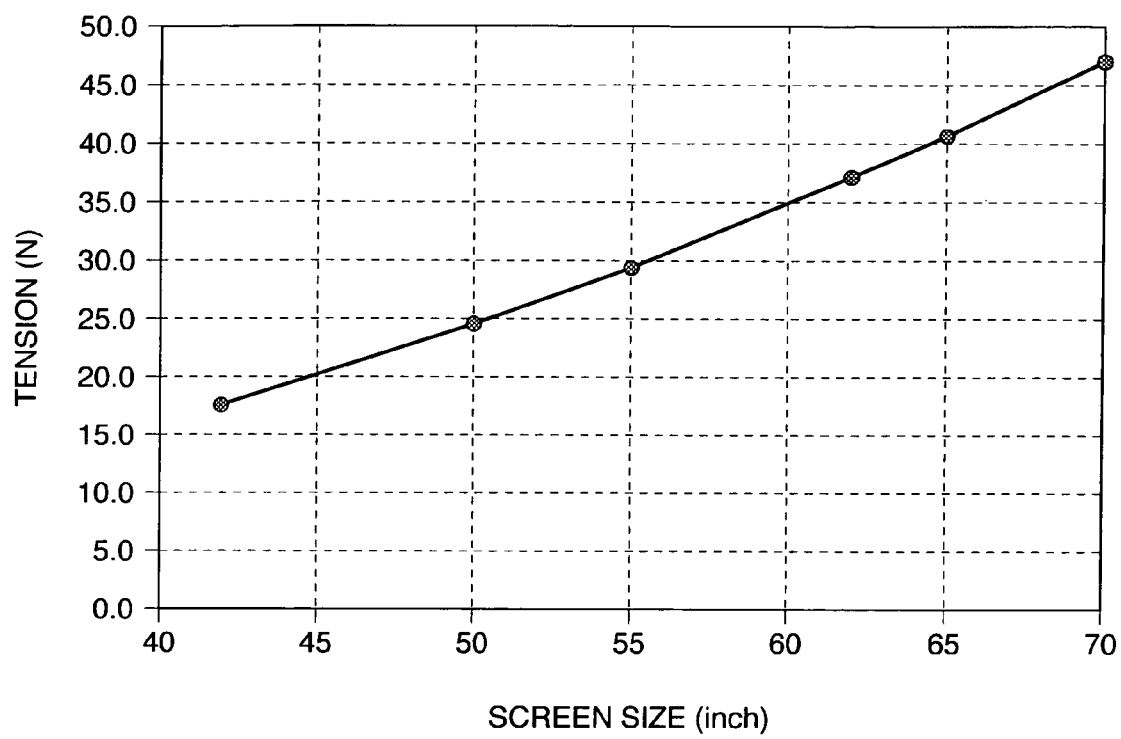
FIG. 4 is a graph charting a relationship between tensions given to the screen and the screen size.

Similar experiments were conducted with various screen sizes. The results are plotted in FIG. 4. FIG. 4 shows the relationship between the tensions given in the horizontal direction and the screen size. It will be seen that the greater the screen size, the greater the tension in the horizontal direction.

Incidentally, although the hanging members 3 are disposed at the center and on the right and left sides symmetric with respect to the center, or in a total of three positions, in this embodiment with a view to cost saving, their arrangement is not limited to this. In order to arrange the hanging members 3 symmetrically with respect to the center, an odd number of hanging members 3 can be used. For instance, five hanging members may be used by arranging one of them in the central position of the upper side of the screen and two each on the right and left sides. Seven hanging members could be arranged in a similar way. In any case, the sliding of hanging members on the right and left sides by the expansion or contraction of the screen due to variations in the ambient temperature and/or humidity are made symmetric with reference to the center between the right and left.

As described above, the configuration of this embodiment according to the invention can satisfactorily ease or absorb any distortion of the screen caused by its expansion or contraction due to variations in the ambient temperature and/or humidity.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A projection type image display apparatus comprising:
a screen on which an image is to be projected,
a screen frame which is fixed to a housing of said display apparatus and from which said screen is hung, and
a plurality of hanging members to be fitted to said screen frame, disposed at least at the center of the upper side and on the right and left sides of the screen, wherein:
the extents of shifting of the hanging members disposed on the right and left sides of said screen in the horizontal direction are made greater than the extent of shifting of the hanging member disposed at the center of said screen in the horizontal direction.

2. The projection type image display apparatus as claimed in claim 1, wherein said screen comprises a front sheet for diffusing lights of the image at least in the horizontal direction and a Fresnel lens sheet which is arranged on the light incidence side of the front sheet and in which a Fresnel lens is formed, wherein:
said plurality of hanging members are disposed on the upper side of said front sheet.

3. The projection type image display apparatus as claimed in claim 2, wherein a supporting member whose section is L-shaped is disposed on the lower side of said front sheet, said Fresnel lens sheet is mounted on said supporting member, and tension is given by the weight of the Fresnel lens sheet in the vertical direction of said front sheet.

4. The projection type image display apparatus as claimed in claim 3, wherein coupling members to be coupled with tensioning members for giving tension in the horizontal direction of said front sheet are disposed at the right and left ends of said front sheet.

5. The projection type image display apparatus as claimed in claim 4, wherein a plurality of said coupling members are disposed at each of the right and left ends of said front sheet.

6. The projection type image display apparatus as claimed in claim 1, wherein a hole is bored in each of the hanging members disposed in the central part and on the right and left sides of said screen, and said screen frame has bosses, each of which is disposed in a position matching each of the holes bored in said hanging members and to be inserted into the hole.

7. The projection type image display apparatus as claimed in claim 6, wherein the size of the hole in the horizontal direction in each of the hanging members positioned on the right and left sides of said screen is greater than the size of the hole in the horizontal direction in the hanging member positioned in the central part of said screen.

8. The projection type image display apparatus as claimed in claim 7, wherein the holes in the hanging members positioned on the right and left sides of said screen are elliptic-shaped and the hole in the hanging member positioned in the central part of in the hanging member positioned in the central part of said screen is round.

9. A projection type image display apparatus comprising:
a screen on which an enlarged image is to be projected,
a screen frame which is fixed to a housing of said display apparatus, and
a plurality of hanging members to be fitted to said screen frame, disposed at least at a center part and on right and left sides of the upper side of said screen, wherein:
a hole is bored in each of said plurality hanging members, and said screen frame has bosses, each of which matches each of the holes in the hanging members and is to be inserted into the hole, and
the size of the hole in the horizontal direction in each of the hanging members positioned on the right and left sides of said screen is greater than the size of the hole in the horizontal direction in the hanging member positioned in the central part of said screen.

10. The projection type image display apparatus as claimed in claim 9, wherein said screen comprises a front sheet for diffusing lights of the image at least in the horizontal direction and a Fresnel lens sheet which is arranged on the light incidence side of the front sheet and in which a Fresnel lens is formed,
said plurality of hanging members are disposed on the upper side of said front sheet, a supporting member whose section is L-shaped is disposed on the lower side of said front sheet, said Fresnel lens sheet is mounted on said supporting member, and a tension is given by the weight of the Fresnel lens sheet in the vertical direction of said front sheet.

11. The projection type image display apparatus as claimed in claim 10, wherein coupling members to be coupled with tensioning members for giving tension in the horizontal direction of said front sheet are disposed at the right and left ends of said front sheet.

12. The projection type image display apparatus as claimed in claim 11, wherein a plurality of said supporting members are disposed, and each supporting member is arranged in a position matching one or another of said hanging members on the lower side of said front sheet.

* * * * *